(12) United States Patent
Walton et al.

(10) Patent No.: US 12,489,197 B1
(45) Date of Patent: Dec. 2, 2025

(54) SYSTEMS AND METHODS FOR SATELLITE THERMAL MANAGEMENT

(71) Applicant: Care Weather Technologies, Inc., Provo, UT (US)

(72) Inventors: Michael Patrick Walton, Provo, UT (US); Alex Roman Laraway, Vineyard, UT (US)

(73) Assignee: Care Weather Technologies, Inc., Provo, UT (US)

( * ) Notice: Subject to any disclaimer, the term of this patent is extended or adjusted under 35 U.S.C. 154(b) by 0 days.

(21) Appl. No.: 19/016,906

(22) Filed: Jan. 10, 2025

(51) Int. Cl.
*H02S 40/42* (2014.01)
*B64G 1/44* (2006.01)
*H01Q 1/24* (2006.01)
*H01Q 1/28* (2006.01)

(52) U.S. Cl.
CPC ............... *H01Q 1/24* (2013.01); *B64G 1/443* (2013.01); *H02S 40/42* (2014.12); *H01Q 1/288* (2013.01)

(58) Field of Classification Search
CPC ....................................................... B64G 1/10
See application file for complete search history.

(56) References Cited

U.S. PATENT DOCUMENTS

| | | | |
|---|---|---|---|
| 11,021,270 B2 * | 6/2021 | Honour | H02S 20/30 |
| 2016/0288928 A1 * | 10/2016 | Smith | B64G 1/506 |
| 2019/0238216 A1 * | 8/2019 | Avellan | H04B 7/18534 |

* cited by examiner

*Primary Examiner* — Arfan Y. Sinaki
(74) *Attorney, Agent, or Firm* — Scale LLP

(57) ABSTRACT

The present disclosure provides a thermal management system for a satellite. The system may include a plurality of photovoltaic cells configured to generate electrical power, an active array antenna including transmit-receive (T/R) modules with power amplifiers, a thermal core thermally coupled to the photovoltaic cells and antenna, and a phase-change material (PCM) element disposed within the thermal core and thermally coupled to the T/R modules. The thermal core may be configured to spread heat across the satellite. One or more of the photovoltaic cells may be configured to radiate heat generated by the T/R modules. The system may enable efficient thermal management in a compact satellite design by utilizing the photovoltaic cells as radiative surfaces and incorporating the PCM element to stabilize temperature fluctuations.

20 Claims, 11 Drawing Sheets

SYSTEMS AND METHODS FOR SATELLITE THERMAL MANAGEMENT

FIELD OF THE DISCLOSURE

The present disclosure relates to systems and methods for satellite thermal management.

BACKGROUND

Satellite technology has become an important part of modern society, providing services such as global communications, weather monitoring, and Earth observation. As the demand for satellite-based services continues to grow, there is an increasing need for more cost-effective and efficient satellite systems.

One of the challenges in satellite development is managing the costs associated with launching and operating satellites in space. These costs are largely driven by the size, weight, and power requirements of traditional satellite designs. Larger satellites may require more powerful launch vehicles and consume more fuel to maintain their orbits, which may increase overall mission expenses.

Thermal management is another important aspect of satellite design. Satellites operate in the extreme temperature conditions of space, where they are exposed to intense solar radiation and the cold vacuum of space. Effective thermal control may help maintain the proper functioning of sensitive electronic components and contribute to the longevity of the satellite.

Power consumption and the associated heat management have traditionally caused active microwave satellites to be large. For example, power consumption may require large solar panels and power management systems. Use of power by the satellite components can also generate large amounts of waste heat, in some cases due to inefficiency associated with power amplifiers. Solar panels, radiators, and active liquid cooling systems are components that may contribute to making the satellite larger and more expensive in some cases.

As the space industry evolves, there is growing interest in developing smaller, more agile satellite platforms that can provide comparable or improved performance at lower costs. This shift towards miniaturization and increased efficiency presents challenges in satellite design, particularly in areas such as thermal management. As the demand for satellite-based services continues to expand, there is a need for innovative approaches to satellite design that can address these challenges while improving overall system performance and reducing costs.

SUMMARY

The following description presents a simplified summary in order to provide a basic understanding of some aspects described herein. This summary is not an extensive overview of the claimed subject matter. It is intended to neither identify key or critical elements of the claimed subject matter nor delineate the scope thereof.

According to aspects of the present disclosure, a thermal management system for a satellite is provided. The thermal management system may include a plurality of photovoltaic cells, wherein each photovoltaic cell is configured to generate electrical power. The system may include an active array antenna comprising a plurality of transmit-receive (T/R) modules, wherein each T/R module may be configured to transmit and receive signals, and wherein each T/R module may comprise a power amplifier. The system may include a thermal core thermally coupled to the plurality of photovoltaic cells and the active array antenna, the thermal core configured to spread heat across the satellite. The system includes a phase-change material (PCM) element disposed within the thermal core and thermally coupled to the plurality of T/R modules. One or more of the plurality of photovoltaic cells are configured to radiate heat generated by the plurality of T/R modules.

According to aspects of the present disclosure, the thermal management system may include one or more of the following features. The PCM element may be a heat sink and the power amplifiers may be thermally attached to the heat sink. Each T/R module may further comprise a directional coupler configured to receive an amplified output from the power amplifier and provide an attenuated transmit signal for calibration, and a switch configured to receive an output from the directional coupler and configured to selectively route signals between transmit and receive paths. The power amplifiers may be solid state power amplifiers. The thermal core may comprise a foam fill. The thermal core may provide radio frequency shielding for one or more components of the satellite. The thermal core may further comprise a solid chassis. The system may further comprise thermally-conductive gap fillers configured to allow heat transfer between the thermal core and one or more thermally coupled components of the satellite. The thermal core may further comprise at least one of embedded heat pipes or vapor chambers, wherein the embedded heat pipes or vapor chambers are configured to improve heat transfer. The PCM element may be configured to absorb or release latent heat to stabilize temperature fluctuations of the satellite. The plurality of photovoltaic cells may include one or more photovoltaic cells disposed on a zenith face of the satellite. The plurality of photovoltaic cells may include one or more photovoltaic cells disposed on a nadir face of the satellite.

According to aspects of the present disclosure, a method for managing thermal conditions in a satellite is provided. The method may include generating electrical power using a plurality of photovoltaic cells. The method may include transmitting and receiving signals through an active array antenna that may include a plurality of transmit-receive (T/R) modules, wherein each T/R module may comprise a power amplifier. The method may include spreading heat across the satellite using a thermal core, wherein the thermal core is thermally coupled to the plurality of photovoltaic cells and the active array antenna. The method may include disposing a phase-change material (PCM) element within the thermal core, wherein the PCM element may be thermally coupled to the plurality of T/R modules. The method may include radiating heat generated by the plurality of T/R modules through one or more of the plurality of photovoltaic cells.

According to aspects of the present disclosure, the method may include one or more of the following features. The PCM element may be a heat sink and the power amplifiers may be thermally attached to the heat sink. Each T/R module may further comprise a directional coupler configured to receive an amplified output from the power amplifier and provide an attenuated transmit signal for calibration, and a switch configured to receive an output from the directional coupler and configured to selectively route signals between transmit and receive paths. The power amplifiers may be solid state power amplifiers. The thermal core may further comprise a solid chassis. The method may further comprise using thermally-conductive gap fillers configured to allow heat transfer between the thermal core and one or more thermally coupled components of the satellite. The thermal core may further comprise at least one of embedded heat pipes or vapor chambers, wherein the embedded heat pipes or vapor chambers are configured to improve heat transfer.

According to aspects of the present disclosure, a satellite is provided. The satellite may include a plurality of photovoltaic cells disposed on one or more faces of the satellite, wherein each photovoltaic cell may be configured to generate electrical power. The satellite may include an active array antenna comprising a plurality of transmit-receive (T/R) modules, wherein each T/R module may be configured to transmit and receive signals, and wherein each T/R module may comprise a power amplifier. The satellite may include a thermal core thermally coupled to the plurality of photovoltaic cells and the active array antenna, the thermal core configured to spread heat across the satellite. The satellite may include a phase-change material (PCM) element disposed within the thermal core and thermally coupled to the plurality of T/R modules. One or more of the plurality of photovoltaic cells may be configured to radiate heat generated by the plurality of T/R modules.

Further variations encompassed within the systems and methods are described in the detailed description of the invention below.

BRIEF DESCRIPTION OF THE DRAWINGS

The accompanying drawings, which are incorporated in and constitute a part of this specification, show certain aspects of the subject matter disclosed herein and, together with the descriptions, help explain some of the principles associated with the disclosed implementations.

DETAILED DESCRIPTION

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Figure 1:
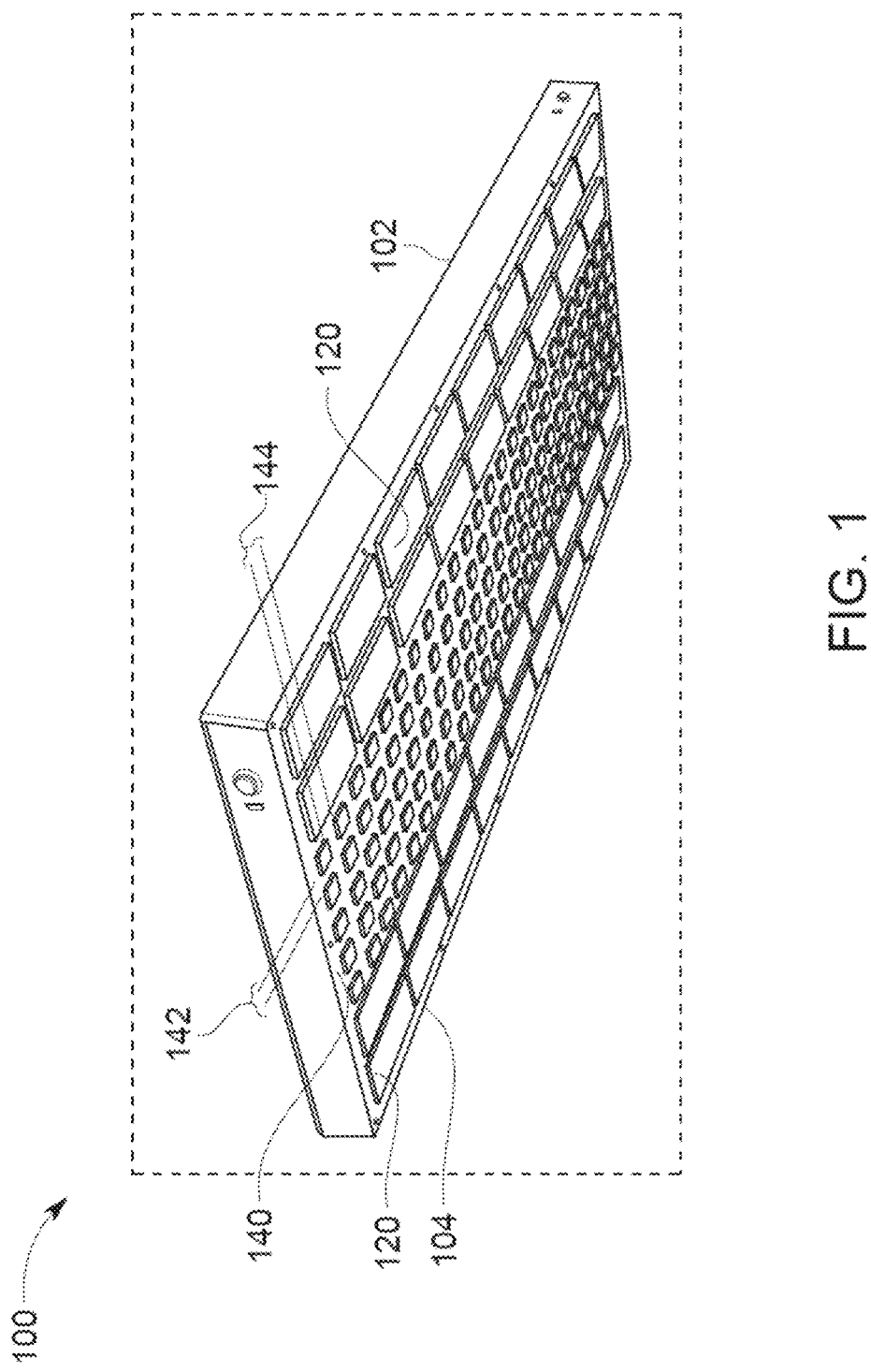
FIG. 1 depicts a satellite, according to aspects of the present disclosure.

FIG. 1 depicts a satellite 100 according to aspects of the present disclosure. The satellite 100 may include a zenith face 102 and a nadir face 104. In some aspects, the zenith face 102 and the nadir face 104 may be configured to be parallel to each other.

The satellite 100 may include one or more photovoltaic cells 120. In some aspects, one or more photovoltaic cells 120 may be arranged on the zenith face 102. The photovoltaic cells 120 on the zenith face 102 may be used for direct solar power generation. In some aspects, one or more photovoltaic cells 120 may be arranged on the nadir face 104. The photovoltaic cells 120 on the nadir face 104 may be used for power generation from planetary albedo.

In some aspects, one or more photovoltaic cells 120 may also be positioned on one or more additional faces of the satellite 100. This configuration may allow for additional power generation capabilities and may provide flexibility in optimizing the satellite's power generation based on its orientation and orbit. The placement of photovoltaic cells 120 on multiple faces of the satellite 100 may also contribute to more uniform heat distribution and thermal management across the satellite structure.

The number of photovoltaic cells 120 used on the satellite 100 may vary depending on mission requirements and design considerations. For example, where additional space is needed on the nadir face 104 for the antenna array 140, fewer or no photovoltaic cells 120 may be used on the nadir face 104. This configuration may allow for a larger antenna array 140, which may enhance the satellite's communication or observation capabilities. In such cases, the satellite 100 may rely more heavily on photovoltaic cells 120 positioned on the zenith face 102 or other faces of the satellite for power generation. The flexibility in photovoltaic cell placement and quantity may enable designers to optimize the satellite's power generation capabilities while accommodating other mission-critical components and systems.

In some aspects, the photovoltaic cells 120 may be formed into solar panels. These solar panels may be integrated into the structure of the satellite 100 or may be deployable. The solar panels may include multiple photovoltaic cells 120 arranged in an array to maximize power generation efficiency. In some aspects, the solar panels may be rigid structures, while in other cases, they may be flexible or semi-flexible, allowing for compact storage during launch and deployment once in orbit. The configuration and number of the solar panels may vary depending on the specific power requirements of the satellite 100 and its intended mission.

An antenna array 140 may be disposed on the nadir face 104 of the satellite 100. The antenna array 140 may include a plurality of rows of antennas 142 and a plurality of columns of antennas 144. In some aspects, the antenna array 140 may be arranged in a grid-like pattern on the nadir face 104.

The number of rows and columns of antennas in the antenna array 140 may vary depending on the specific requirements and design considerations of the satellite 100. Similarly, the number of antennas within each row and column may also vary depending on requirements. In some aspects, there may be at least 5 antennas in each row of the antenna array 140. In some aspects, there may be at least 10 antennas in each row, allowing for enhanced signal coverage and reception capabilities. This flexibility in the configuration of the antenna array 140 may contribute to optimizing the satellite's performance for various communication and observation tasks.

In some aspects, the antenna array 140 may include body-mounted segments, deployable segments, or a combination of both. The body-mounted segments may be integrated directly onto the nadir face 104 or other surfaces of the satellite 100, providing a compact and stable antenna configuration during launch and initial deployment. Deployable segments may be included to expand the effective aperture of the antenna array 140 once the satellite is in orbit. These deployable segments may unfold or extend from the satellite body, increasing the overall size and capabilities of the antenna array. In some configurations, a single antenna element may comprise both a body-mounted portion and a deployable portion, allowing for a hybrid approach that combines the simplicity of fixed antennas with the increased aperture size of deployable structures. This flexible approach may enable satellite designers to optimize the antenna array 140 for specific mission requirements, balancing factors such as launch vehicle constraints, desired signal strength, and coverage area.

As described in additional detail below, the antenna array 140 may include one or more transmit-receive (T/R) modules. These T/R modules may be integral components of the antenna array, enabling both transmission and reception of signals. Each T/R module may be associated with one or more individual antennas within the array. The T/R modules may serve as the interface between the antennas and the satellite's signal processing systems. In some aspects, each T/R module may include components such as power amplifiers for boosting outgoing signals, low-noise amplifiers for enhancing received signals, phase shifters for beam steering, and switches for alternating between transmit and receive modes.

In some aspects, the antennas in the antenna array 140 may be planar antennas. In some aspects, the planar antennas may be patch antennas. The use of planar antennas, such as patch antennas, may allow for a compact and low-profile design of the antenna array 140. This configuration may contribute to reducing the overall size and weight of the satellite 100, which may be beneficial for launch and operational costs. In some aspects, the patch antennas may be fabricated directly onto the nadir face 104 or onto a separate substrate that is then mounted on the nadir face 104. The planar nature of these antennas may also facilitate integration with other satellite components and systems, which may simplify the overall satellite design and assembly process.

As will be described in additional detail below, the use of planar antennas (and planar elements generally) may help improve the aerodynamics of the satellite and increase the orbital life. For example, the low-profile nature of planar antennas may reduce the satellite's overall cross-sectional area, which may decrease atmospheric drag in low planetary orbit. This reduction in drag may allow the satellite to maintain its desired orbit for a longer period, extending the operational lifespan of the mission.

The arrangement of photovoltaic cells 120 and the antenna array 140 on the nadir face 104 may allow for efficient use of the available surface area. This configuration may enable the satellite 100 to generate power while simultaneously performing its primary mission functions using the antenna array 140.

In some aspects, the satellite 100 may be designed as a flat satellite, featuring a thin, planar structure with a relatively large surface area compared to its thickness. This configuration may offer advantages in terms of launch efficiency, orbital dynamics, and thermal management. As will be described in greater detail below, the flat design may provide more area for solar power, antennas, and thermal radiation without requiring complex deployables. The flat design may also contribute to reduced atmospheric drag in low planetary orbit.

In some aspects, the flat satellite design may facilitate the integration of large antenna arrays and solar panels on the satellite's surfaces. This approach may enable enhanced communication capabilities and improved power generation efficiency. The extended surface area of a flat satellite may also provide increased radiative cooling capacity, which may improve thermal management.

Compared to traditional satellites, relatively higher surface area to volume ratios may be achievable using the flat satellite design described herein. In some aspects, a surface area to volume ratio of the satellite 100 may be at least 10, at least 20, or at least 25. The specific surface area to volume ratio used for a satellite may depend on various factors such as mission objectives, payload requirements, orbital parameters, and design constraints.

In some aspects, alternative shapes (e.g., a cube or disk) may be used for the satellite 100. The choice of satellite form factor may depend on factors such as mission objectives, payload requirements, launch vehicle compatibility, and orbital considerations.

In some aspects, the satellite 100 may be configured as a scatterometer. The scatterometer may be a microwave radar sensor used to measure the reflection or scattering effect produced while scanning the surface of a planet from an aircraft or a spacecraft. The satellite 100, when functioning as a scatterometer, may be designed to measure the strength of backscattered radar pulses from the planet's surface, particularly ocean surfaces.

The scatterometer functionality of the satellite 100 may allow it to measure near-surface wind speed and direction over the planet's oceans. This capability may be achieved by transmitting microwave pulses towards the planet's surface and analyzing the power of the returned signal. In some aspects, the antenna array 140 of the satellite 100 may be specifically designed to support scatterometer operations. The arrangement and number of antennas in the array may be optimized to provide the desired coverage and resolution for wind measurements.

The data collected by the satellite 100 when operating as a scatterometer may be valuable for various applications, including weather forecasting, climate monitoring, and oceanographic studies. The wind information derived from scatterometer measurements may be used to improve numerical weather prediction models and enhance our understanding of global atmospheric and oceanic circulation patterns.

Thermal Management

A thermal management system for a satellite according to aspects of the present disclosure will now be described.

Figure 2:
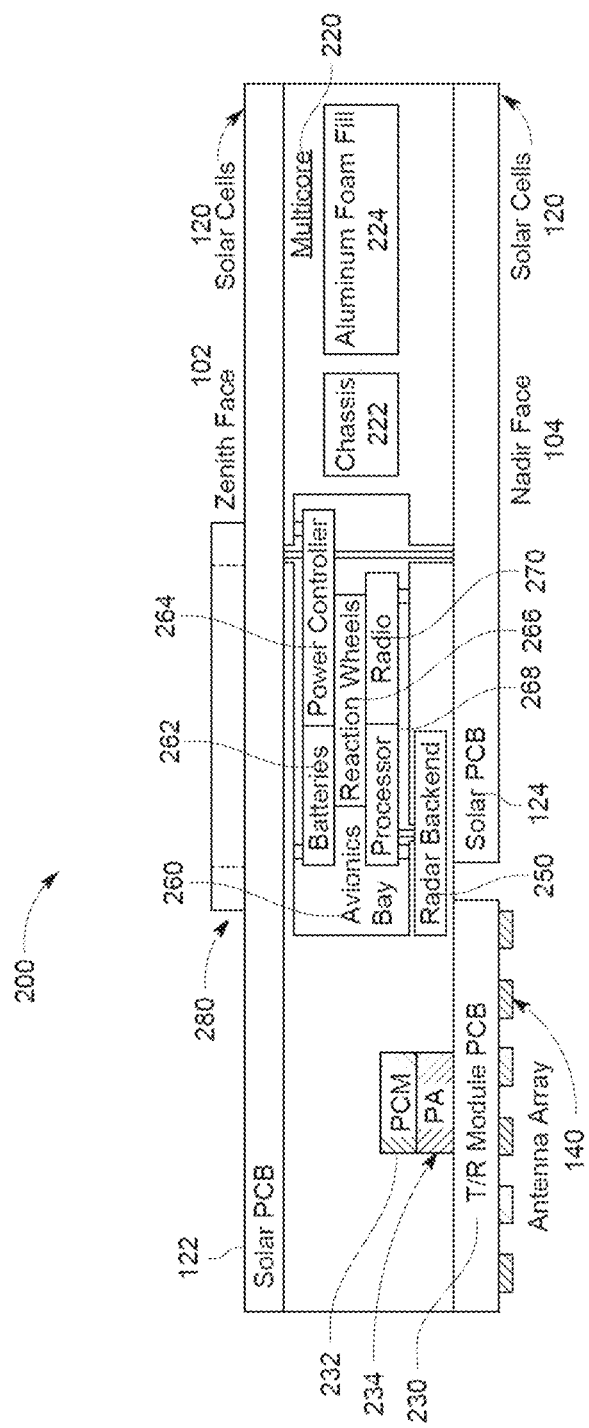
FIG. 2 depicts a cross-sectional view of a multi-layer stack of a satellite thermal management system, according to aspects of the present disclosure.

FIG. 2 depicts a cross-sectional view of a multi-layer stack of a thermal management system for a satellite 200, according to aspects of the present disclosure. As described with respect to satellite 100 in FIG. 1, the satellite 200 may include a zenith face 102 and a nadir face 104. In some aspects, the zenith face 102 and the nadir face 104 may each include one or more solar printed circuit boards (PCB). The zenith face 102 may include a solar PCB 122 while the nadir face 104 may include a solar PCB 124. The solar PCBs 122, 124 may connect to photovoltaic cells 120 for generating electrical power for the satellite 200.

The satellite 200 may include a multicore 220, which may alternatively be referred to as a thermal core. The multicore may be configured to stabilize thermal fluctuations by transferring heat between faces of the satellite, including between the zenith face 102 and the nadir face 104. In some aspects, the multicore 220 may comprise a chassis 222 with a foam fill 224. In some aspects, the chassis may comprise solid aluminum and the foam filling may comprise aluminum foam fill. In some aspects, thermally-conductive gap fillers may be used to optimize heat transfer between the multicore and connected components. multicore structure may also include components including embedded heat pipes and vapor chambers to improve two-dimensional heat transfer along the long dimension of the satellite. In some aspects, the multicore 220 may serve additional purposes. For example, the multicore 220 may improve the rigidity of and provide structural support for the satellite and may provide radio-frequency (RF) shielding for RF electronics of the satellite.

In some aspects, the thermal core may not include a separate chassis structure, but instead may be configured as one layer in a stack of layers filling various satellite functions, such as solar power generation, avionics, and/or radiofrequency apertures (e.g., antennas). This layered structure may include thermally conductive materials to manage heat transfer within the satellite, as well as insulating materials in select areas to reduce heat transfer to heat sensitive components (e.g., batteries). For example, the thermal core may comprise layers of aluminum and may further include insulating components and materials including vacuum gaps and lightweight insulating foams. The insulating components and materials may be positioned in select locations rather than as full layers, allowing the thermally conductive layers to transfer heat within the satellite. This configuration may allow for efficient heat spreading and thermal management while reducing the overall weight of the satellite structure. This configuration may also provide flexibility in tailoring the thermal properties of the core to meet specific mission requirements or to address thermal challenges in different areas of the satellite.

The satellite 200 may include the antenna array 140 on the nadir face 104. As described in additional detail below, the antenna array 140 may be used for transmitting and receiving signals. In some aspects, one or more T/R module PCBs 230 may be positioned adjacent to the antenna array 140. The T/R module PCB 230 may serve as a mounting platform or housing for the T/R module components. In some aspects, and as described in additional detail in relation to FIG. 3, the T/R module PCB 230 may integrate various elements of the T/R module, including power amplifiers, low-noise amplifiers, phase shifters, and switches.

In some aspects, the satellite 200 may include one or more phase-change material elements disposed within the multicore 220. In some aspects, the phase-change material element may be a phase-change material heat sink 232. In some aspects, the satellite may include a power amplifier array 234 thermally coupled to the heat sink 232. In some aspects, the phase-change material heat sink 232 may be used for thermal management of the power amplifiers in the power amplifier array 234.

In some aspects, the phase-change material may be selected to manage temperature fluctuations within the satellite 200. The phase-change material may be chosen to cap the maximum temperature in the oscillation by absorbing incoming heat above its phase-change temperature. This configuration may help prevent overheating of sensitive components during periods of high thermal load.

Alternatively, the phase-change material may be selected to cap the minimum temperature by releasing latent heat below its phase-change temperature. This approach may help maintain a minimum operating temperature for components that require a certain thermal threshold to function optimally.

In some aspects, a material with a phase-change temperature in the middle of the expected temperature range may be chosen. This configuration may reduce the size of the total temperature oscillation by absorbing or releasing heat before the system heats or cools beyond the phase-change temperature. Such an arrangement may help maintain a more stable thermal environment within the satellite, which may improve the performance and longevity of various components.

The selection of the phase-change material and its specific properties may depend on factors such as the satellite's orbit, expected thermal loads, and the thermal requirements of various onboard systems. The flexibility in choosing the phase-change material properties may allow designers to tailor the thermal management system to the specific needs of the satellite mission.

A radar backend 250 may be positioned within the satellite 200. As described in additional detail in relation to FIG. 3, the radar backend 250 may process signals received by the antenna array 140 and generate signals for transmission. In some aspects, a single backend 250 may be operably connected to each of the various T/R modules.

The satellite 200 may include an avionics bay 260. The avionics bay 260 may contain various components for controlling and operating the satellite 200. For example, these components may include batteries 262, a power controller 264, reaction wheels 266, a processor 268, and a radio 270.

The satellite 200 may include a separation ring 280. The separation ring 280 may be used for attaching the satellite 200 to a launch vehicle and for separating the satellite 200 from the launch vehicle once in orbit. In some aspects, an 8 inch separation ring may be used.

In some aspects, the satellite 200 may utilize the photovoltaic cells 120 or solar panels formed by the photovoltaic cells 120 as its main radiative surface. This configuration may allow for efficient heat dissipation while simultaneously generating power for the satellite's operations. The large surface area provided by the solar panels may serve a dual purpose, acting as both a power generation system and a thermal management component. By integrating the thermal management function into the solar panels, the satellite design may achieve improved efficiency in terms of space utilization and overall system performance.

In active microwave systems, a significant portion of waste heat may be generated by frontend power amplifiers. The thermal management system of the satellite 200 may be designed to efficiently dissipate this heat. For example, the satellite 200 may utilize an active array of T/R modules to spread heat management across the satellite, as described in additional detail in reference to FIG. 3. By distributing the power amplifiers across the array, the heat generation may be spread more evenly, which may enhance the effectiveness of radiative cooling. Radiative cooling may work more efficiently when heat is distributed evenly across the radiative surface.

In some aspects, the satellite 200 may incorporate photovoltaic cells 120 that are capable of generating electricity from thermal infrared radiation. These cells may serve an additional purpose of converting a portion of the thermal infrared radiation from the sun, which would otherwise be absorbed as heat, into usable electrical energy. By utilizing this type of photovoltaic cell, the satellite may reduce the total heat input to the system. This approach may enhance the overall energy efficiency of the satellite while simultaneously contributing to thermal management. The conversion of thermal infrared to electricity may help mitigate heat buildup within the satellite structure, reducing the load on other thermal control systems. The implementation of such cells may vary depending on factors such as orbital parameters, mission requirements, and the specific thermal environment encountered by the satellite.

Figure 3:
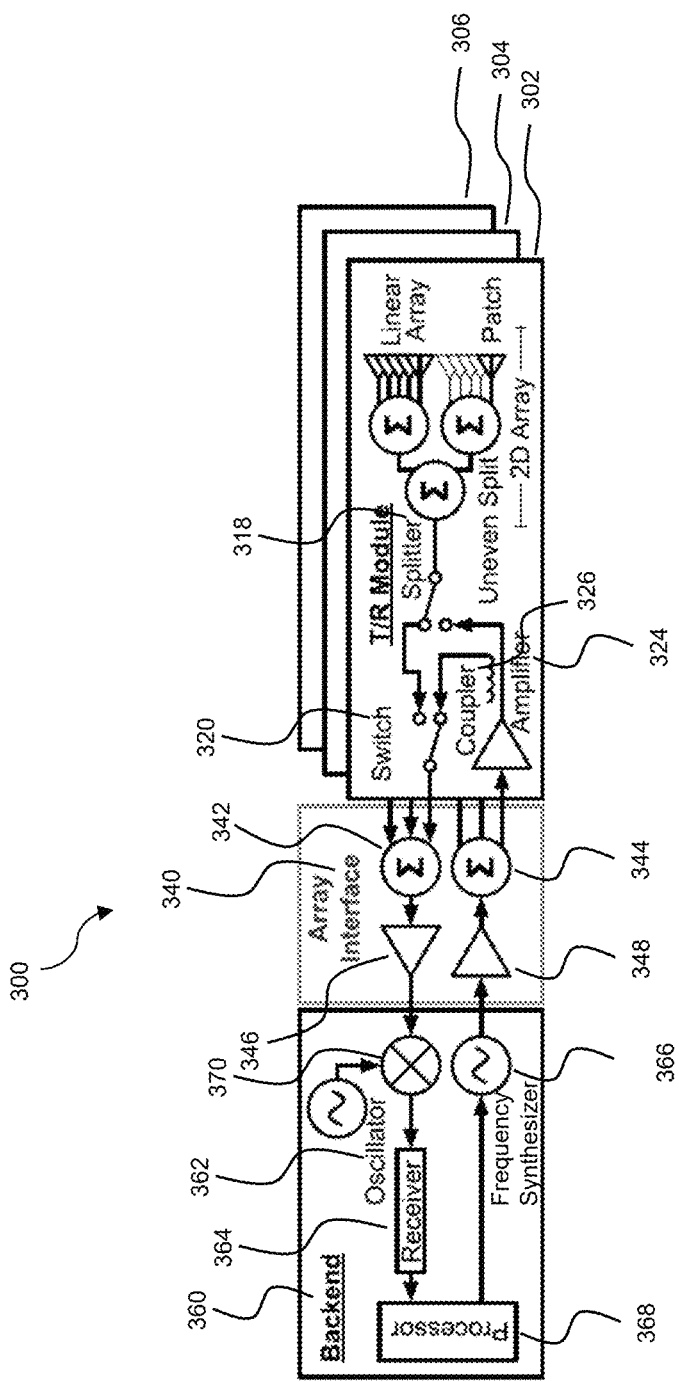
FIG. 3 depicts a block diagram of a signal processing system for a satellite, according to aspects of the present disclosure.

FIG. 3 depicts a block diagram of a signal processing system 300 for a satellite, according to aspects of the present disclosure. The system 300 may include a plurality of T/R modules arranged in a two-dimensional (2D) array. In some aspects, the T/R modules may be configured as an active array for passive cooling. An active array may be characterized by distributed amplifiers across the antenna elements. By distributing the amplifiers across the antenna elements, the heat generation may be spread more evenly across the satellite structure. This distribution of heat sources may enhance the effectiveness of passive cooling mechanisms, such as radiative cooling through the satellite's solar cells or panels.

In the illustrated example, three T/R modules are shown: a first T/R module 302, a second T/R module 304, and a third T/R module 306. However, the number of T/R modules in the array may vary depending on the specific requirements of the satellite and its intended applications.

In addition to distributing the amplifiers across the array, switches and a coupler may also be distributed across the array. In some aspects, each set of amplifiers, switches, and coupler may form a respective T/R module as illustrated in FIG. 3. In some aspects, each T/R module in the signal processing system 300 may include a power amplifier 324, a directional coupler 326, and a high-power, solid-state RF switch 320. In some aspects, the output of the power amplifier 324 may be fed through a directional coupler 326 before entering a switch 320. This configuration may allow for efficient signal routing and power management within each T/R module. The directional coupler 326 may be used to sample a portion of the transmitted signal for monitoring or calibration purposes, while the switch 320 may enable the module to alternate between transmit and receive modes. By incorporating these components within each T/R module, the system may achieve distributed power amplification and signal control across the active array antenna, which may enhance overall system performance and thermal management.

In some aspects, the power amplifiers used in the T/R modules may be solid state power amplifiers. Solid state power amplifiers, such as those utilizing Gallium Nitride (GaN) technology, may offer advantages in terms of size, efficiency, and overall system performance. The compact nature of solid state power amplifiers may allow for more efficient integration within the distributed T/R module architecture, which may contribute to improved thermal management and overall system efficiency. In some aspects, the use of GaN-based solid state power amplifiers may enable higher power output while maintaining a smaller footprint, which may be beneficial for applications where space and weight constraints are important considerations.

In some aspects, each of the T/R modules may be operably connected to a common backend 360. The T/R modules may be connected to the backend 360 through an array interface 340. The interface 340 may include various components to manage the flow of signals between the T/R modules and the backend processing systems. In some aspects, the interface 340 may include directional splitters 342, 344. These splitters may divide signals for distribution to multiple T/R modules or combine signals from multiple modules. The interface 340 may also include amplifiers 346, 348 to boost signal strength at various stages of the signal path.

A backend 360 may be included in the radar system 300 to handle signal generation, processing, and control functions. The backend 360 may comprise several key components that work together to enable the radar's functionality. An oscillator 362 may generate a stable carrier frequency that serves as the basis for the radar signal. A frequency synthesizer 366 may modulate this carrier signal to create the desired waveform for transmission.

The backend 360 may also include a receiver 364 for processing the signals captured by the T/R modules. A processor 368 may be responsible for controlling the overall operation of the radar system, including signal processing, data analysis, and system management tasks. In some aspects, the backend 360 may include a mixer 370 for frequency conversion of signals.

This configuration may allow for flexible and efficient operation of the radar system, enabling various modes of operation and adaptability to different mission requirements. The distributed nature of the T/R modules in the array may also contribute to the thermal management strategy of the satellite, as discussed earlier, by spreading heat generation across a larger area.

Figure 4:
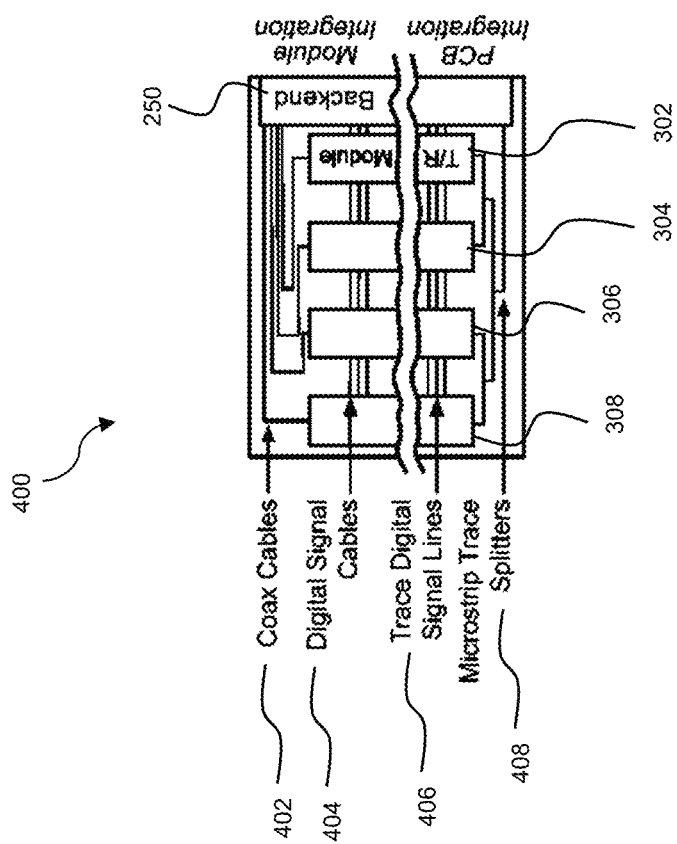
FIG. 4 depicts a system diagram of aspects of an array interface of a satellite, according to aspects of the present disclosure.

FIG. 4 depicts a system diagram 400 of aspects of an array interface of a satellite, according to aspects of the present disclosure. As shown in FIG. 4, various types of connections may be used between the various T/R modules 302, 304, 306, 308 and/or between the various T/R modules 302, 304, 306, 308 and the backend 250.

In some aspects, separate T/R modules may be connected using coax cables 402. The coax cables 402 may provide transmission of signals between T/R modules and the backend 250. In some aspects, multiple T/R module design blocks may be integrated onto a single PCB and connected using microstrip trace splitters 408. The digital signal cables 404 may carry timing and configuration information for coordinating operation of the T/R module elements. In some aspects, digital signal cables 404 or trace digital signal lines 406 may be used for transmitting digital control signals between T/R modules. The particular connection method(s) used may be based on various system requirements and design considerations. For example, the use of PCB integration with microstrip trace splitters may allow for more streamlined production processes and lower manufacturing costs.

Figure 5:
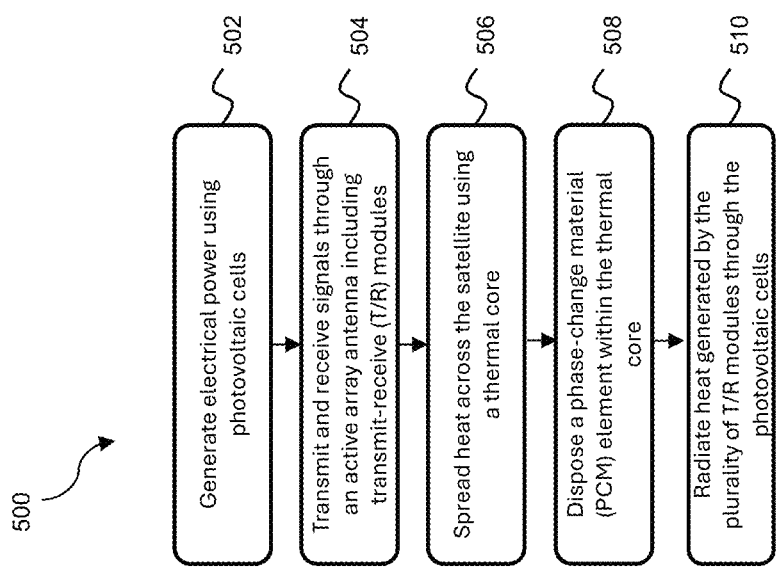
FIG. 5 depicts a flowchart of a method for operating a satellite thermal management system, according to aspects of the present disclosure.

FIG. 5 depicts a flowchart of a method 500 for operating a satellite thermal management system, according to aspects of the present disclosure.

At step 502, electrical power may be generated using photovoltaic cells. The photovoltaic cells may be disposed on one or more faces of the satellite. In some aspects, the photovoltaic cells may be located on one or both of the zenith and nadir faces of the satellite. In some aspects, the photovoltaic cells 120 may be arranged into solar panels to maximize power generation efficiency. In some aspects, the solar panels may be integrated into the satellite structure or may be deployable.

At step 504, signals may be transmitted and received signals through an active array antenna. The active array antenna may include multiple transmit-receive (T/R) modules. Each T/R module may comprise a power amplifier. The power amplifiers may generate heat during operation. In some aspects, each T/R module may also include a directional coupler and a switch for efficient signal routing and power management.

At step 506, the method may involve spreading heat across the satellite using a thermal core or multicore. The thermal core may be thermally coupled to the photovoltaic cells and the active array antenna. In some aspects, the thermal core may include a solid chassis with a foam fill. In some aspects, the thermal core may not include a separate chassis structure, but instead may be configured as one layer in a stack of layers filling various satellite functions, such as solar power generation, avionics, and/or radiofrequency apertures (e.g., antennas). The thermal core may provide radio frequency shielding for one or more components of the satellite. In some aspects, the method 500 may include using thermally-conductive gap fillers to allow heat transfer between the thermal core and one or more thermally coupled components of the satellite. The thermal core may also include embedded heat pipes or vapor chambers to improve two-dimensional heat transfer along the long dimension of the satellite.

At step 508, a PCM element may be disposed within the thermal core. The PCM element may be thermally coupled to the T/R modules. In some aspects, the PCM element may be a heat sink, and the power amplifiers may be thermally attached to the heat sink. The PCM element may absorb or release latent heat to stabilize temperature fluctuations of the satellite. The PCM material may be selected to manage temperature fluctuations within a specific range, either by capping the maximum temperature, the minimum temperature, or reducing the overall temperature oscillation.

At step 510, the method 500 may include radiating heat generated by the T/R modules through one or more of the photovoltaic cells. In some aspects, the photovoltaic cells 120 may be formed into solar panels. The photovoltaic cells or the solar panels formed thereby may serve a dual purpose of generating electrical power and acting as radiative surfaces for heat dissipation. The PCM material may be selected to manage temperature fluctuations within a specific range, either by capping the maximum temperature, the minimum temperature, or reducing the overall temperature oscillation.

Through method 500, the thermal management system may provide improved thermal management for the satellite's components, balancing heat generation from power-consuming elements with heat dissipation through the photovoltaic cells and thermal core.

Conical Scanning

A conical scanning system for a satellite according to aspects of the present disclosure will now be described.

In some aspects, a satellite may employ a body-spun conical scanning system for radiofrequency applications. As shown in FIG. 3, the antenna array may incorporate an uneven splitter for power weighting and may incorporate tuned feed lengths for progressive phase shift, which may result in an antenna beam that is offset from the normal direction of the antenna face. This may enable conical scanning without added drag profile, particularly when combined with aerodynamic spin orientations. These spin orientations may allow the remote sensing system to observe any segment of the total field of view (surface or space) from a variety of viewing angles and/or view a wider swath of the field of view.

Figure 6:
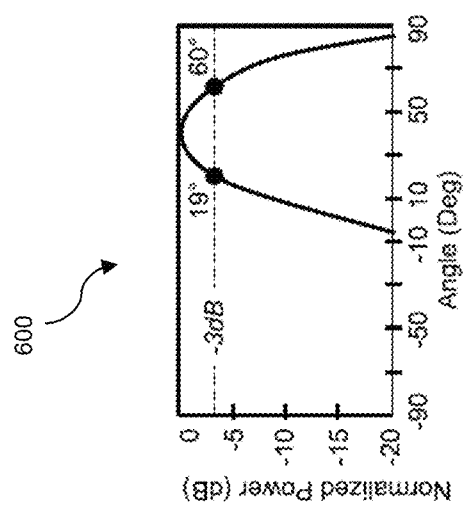
FIG. 6 depicts a graph showing an exemplary beam shape of an offset array antenna, according to aspects of the present disclosure.

FIG. 6 depicts a graph 600 showing an exemplary beam shape of an offset array antenna in the long beam direction. The graph 600 may depict the antenna gain pattern as a function of angle.

The beam shape shown in graph 600 may have an offset of approximately 38 degrees from the antenna boresight. This offset may be achieved using a progressive phase shift across the array elements. In some aspects, the progressive phase shift may be implemented using tuned feed lengths for the antenna elements. The tuned feed lengths may introduce controlled phase delays between array elements. As also shown in graph 600, the beam may have a beamwidth of approximately 41 degrees. This beamwidth may be achieved using a binomial power weighting across the array elements. In some aspects, the power weighting may be implemented using an uneven splitter to distribute power to the antenna elements.

The offset beam shape may improve the satellite's scanning capabilities. For example, by combining the offset beam with the satellite's body spin, the antenna array may be able to scan a conical pattern without requiring complex mechanical steering mechanisms. This configuration may allow the satellite to observe a wide swath of the planet's surface while maintaining an aerodynamic orientation.

In some aspects, the offset beam may enable the satellite to perform yaw scanning, roll scanning, or pitch scanning operations. These scanning modes may allow the satellite to observe different segments of its total field of view from various angles, which may improve the quality and coverage of its measurements. This approach may also reduce complexity and cost compared to traditional scanning methods by eliminating the need for separate spinning and non-spinning sections or for electronically-controlled phase shifters throughout the array.

In some aspects, a control system may be implemented to cause the satellite to maintain spin with respect to the flight direction. This control system may include a combination of sensors, actuator hardware, and software components working together to measure and control the satellite's position and orientation. The sensors may include devices such as gyroscopes, accelerometers, and star trackers, which provide data on the satellite's current attitude and rotational state. Actuator hardware may include reaction wheels, magnetorquers, or thrusters that can apply torques to adjust the satellite's spin. The software component of the control system may process sensor data, determine the necessary adjustments, and command the actuators to maintain the desired spin rate and orientation. This integrated approach may allow the satellite to maintain its spinning motion relative to its flight path, ensuring consistent conical scanning performance while adapting to orbital perturbations and other external factors that could affect the satellite's attitude.

Figure 7:
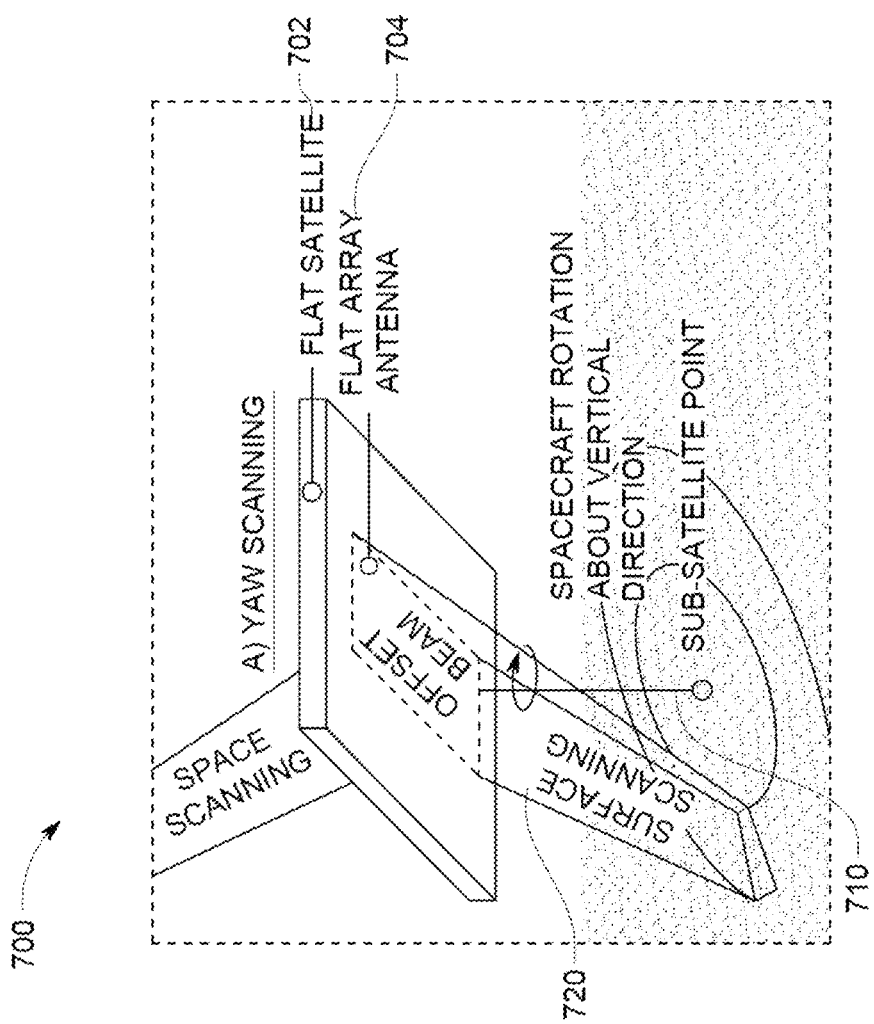
FIG. 7 depicts a diagram showing a satellite performing yaw scanning, according to aspects of the present disclosure.

FIG. 7 depicts a diagram 700 demonstrating a yaw scanning mode, according to aspects of the present disclosure. In the yaw scanning mode, a satellite 702 may rotate about its vertical axis 720, allowing the satellite 702 to observe areas above or below its flight path in a lawnmower-like pattern through the use of an array antenna 704 and offset beam 720 as the satellite 702 travels. The yaw scanning mode may be useful for observing a wide swath of the planet's surface. In some aspects, the satellite 702 may be a flat satellite and the array antenna 704 may be a flat array antenna.

Figure 8:
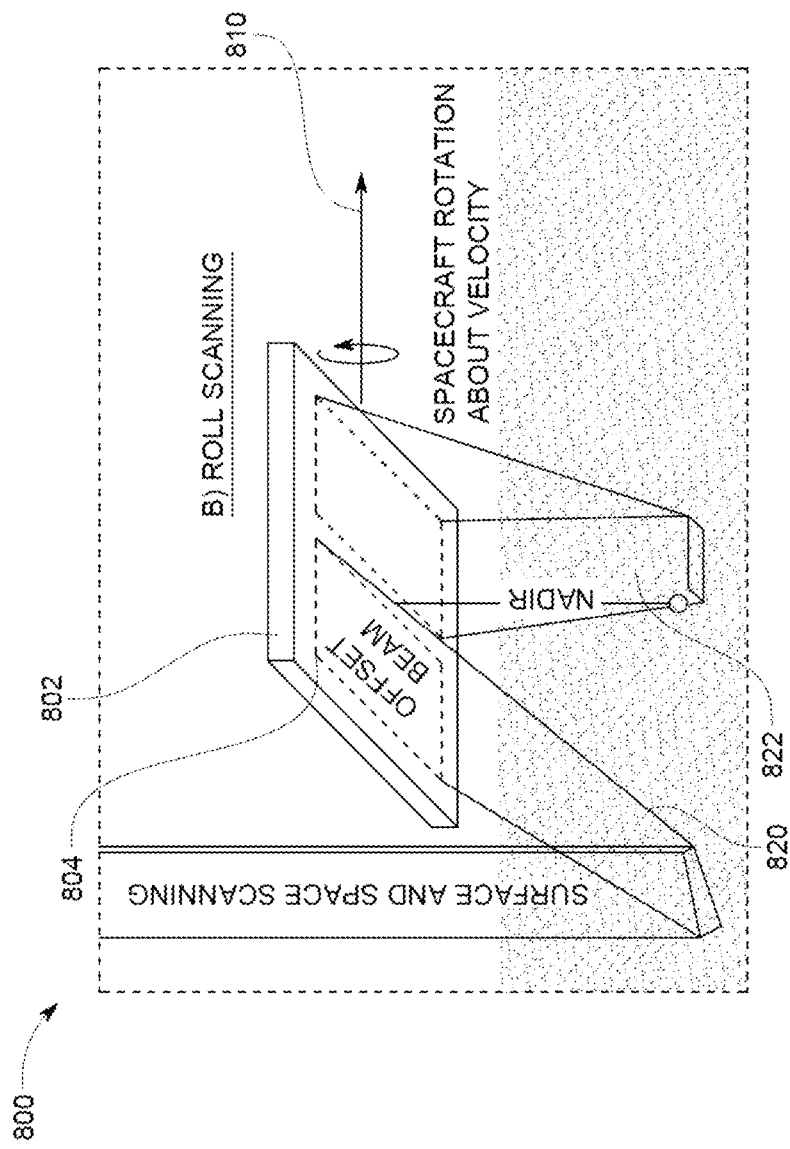
FIG. 8 depicts a diagram showing a satellite performing roll scanning, according to aspects of the present disclosure.

FIG. 8 depicts a diagram 800 demonstrating a roll scanning mode, according to aspects of the present disclosure. In the roll scanning mode, a satellite 802 may rotate about its longitudinal axis 820, enabling the satellite 802 to observe areas above, below, and to the sides of its flight path in sequence. The roll scanning mode may allow for multiple beams 820, 822 offset at different angles to view the same area in quick succession through an array antenna 804, which may provide diverse viewing angles of a target region. In some aspects, the satellite 802 may be a flat satellite and the array antenna 804 may be a flat array antenna.

Figure 9:
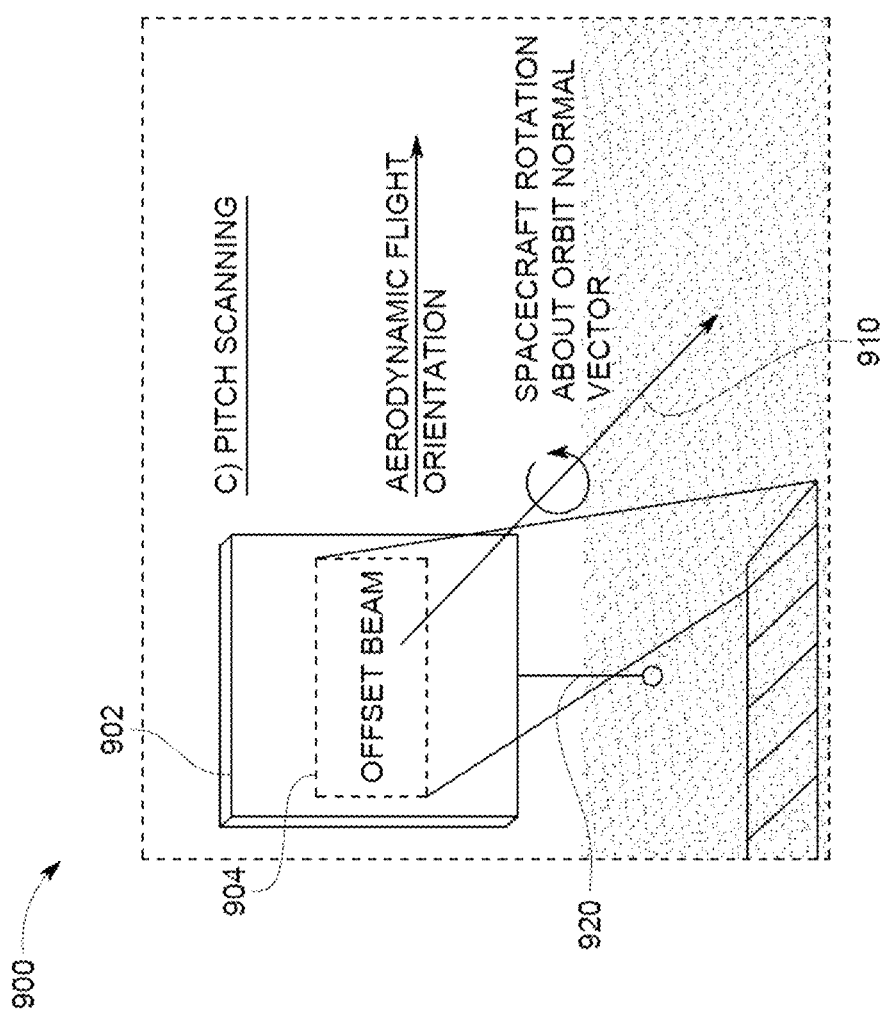
FIG. 9 depicts a diagram showing a satellite performing pitch scanning, according to aspects of the present disclosure.

FIG. 9 depicts a diagram 900 demonstrating a pitch scanning mode, according to aspects of the present disclosure. In the pitch scanning mode, a satellite 902 may rotate about its lateral axis 920, allowing the satellite 902 to observe areas above, below, and to the sides of its flight path in sequence through the use of an array antenna 904 and offset beam 920. The pitch scanning mode may enable a single beam to revisit the same area from multiple incidence angles in quick succession, which may provide detailed information about surface characteristics from different perspectives. In some aspects, the satellite 902 may be a flat satellite and the array antenna 904 may be a flat array antenna.

In some aspects, the satellite may switch between these and other scanning modes depending on the observation requirements or mission objectives. The body-spun scanning approach may allow for flexible and efficient data collection without the need for complex mechanical systems or electronically steered arrays.

In some aspects, the flat satellite design, planar elements, and/or high surface area to volume ratio of the satellite may contribute to the satellite's ability to perform complex scanning operations while maintaining an aerodynamic profile. The flat design and the use of planar elements, such as planar antennas and solar panels, may contribute to the satellite's aerodynamic properties by reducing its overall profile and minimizing atmospheric drag. This may be advantageous for satellites operating in low planetary orbit, where atmospheric drag can significantly impact a satellite's lifespan and orbital stability. In some aspects, the combination of these design features may enable the satellite to perform complex scanning operations, such as yaw, roll, and pitch scanning, without compromising its aerodynamic properties. The flat design and planar elements may allow for the integration of offset beam antennas and body-spun scanning techniques, which may provide wide swath coverage and multiple viewing angles without the need for complex mechanical steering mechanisms or deployable structures.

Figure 10:
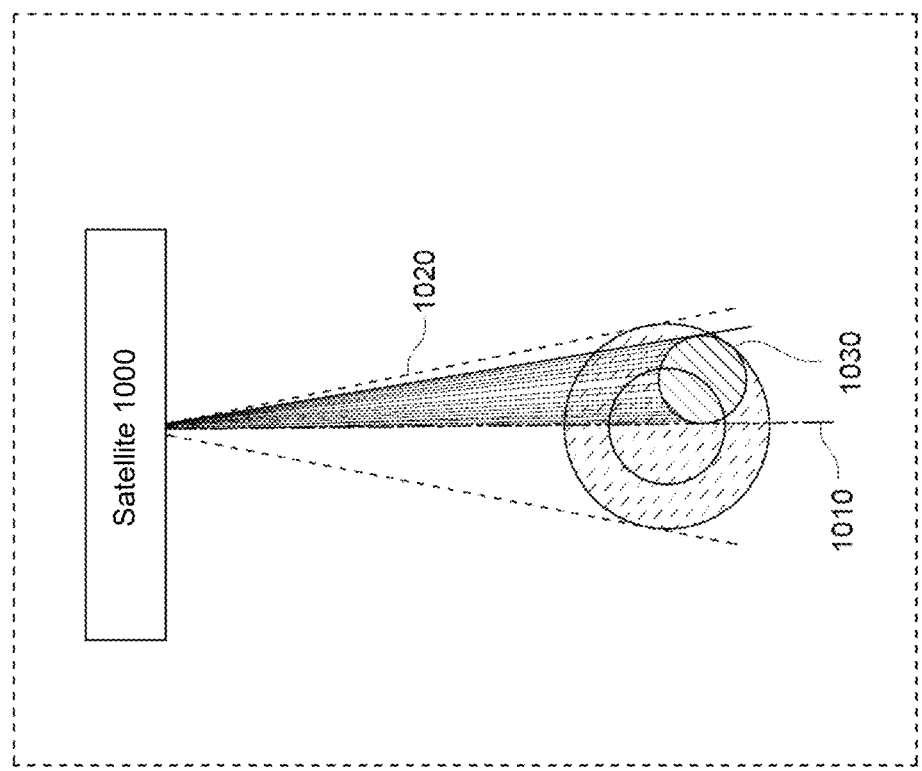
FIG. 10 depicts a diagram showing a satellite performing conical scanning, according to aspects of the present disclosure.

FIG. 10 depicts a diagram showing a satellite performing conical scanning, according to aspects of the present disclosure. In some aspects, the satellite 1000 operates with an axis of rotation 1010, which in the example depicted in FIG. 10 corresponds to the yaw axis of the satellite. As the satellite 1000 rotates about its yaw axis, it generates a conical scanning pattern 1020 that extends outward from the satellite in a cone shape.

In some aspects, the conical scanning pattern 1020 may be produced by the combination of the satellite's rotation and the offset beam generated by the antenna array mounted on the satellite body. As the satellite 1000 rotates, the offset beam traces out a circular path, forming the conical shape of the scanning pattern. As described above, this rotation may allow the satellite to observe a wide segment of the observable sphere without the need for complex mechanical steering mechanisms. The scanning pattern creates a field of view where the conical beam intersects with the segment of the observable sphere being scanned. In the yaw scanning case, this field of view is a footprint 1030 which moves in a lawnmower-like pattern as the satellite progresses along its orbital path. This scanning method may enable efficient coverage of large segments of the observable sphere while maintaining the satellite's aerodynamic profile.

As shown in FIG. 10, the scanning beam emanates from the satellite 1000 and expands outward to form the conical shape before creating the footprint 1030 on the target surface. This conical scanning pattern may allow the satellite to observe the same segment of the observable sphere from multiple viewing angles as it travels, providing more detailed information about the scanned area. In some aspects, the size and shape of the conical scanning pattern and the resulting field of view may be adjusted by modifying the offset angle of the beam relative to the satellite's normal axis. This adjustment may be achieved through the configuration of the antenna array, including factors such as the progressive phase shift and power distribution among the antenna elements.

Figure 11:
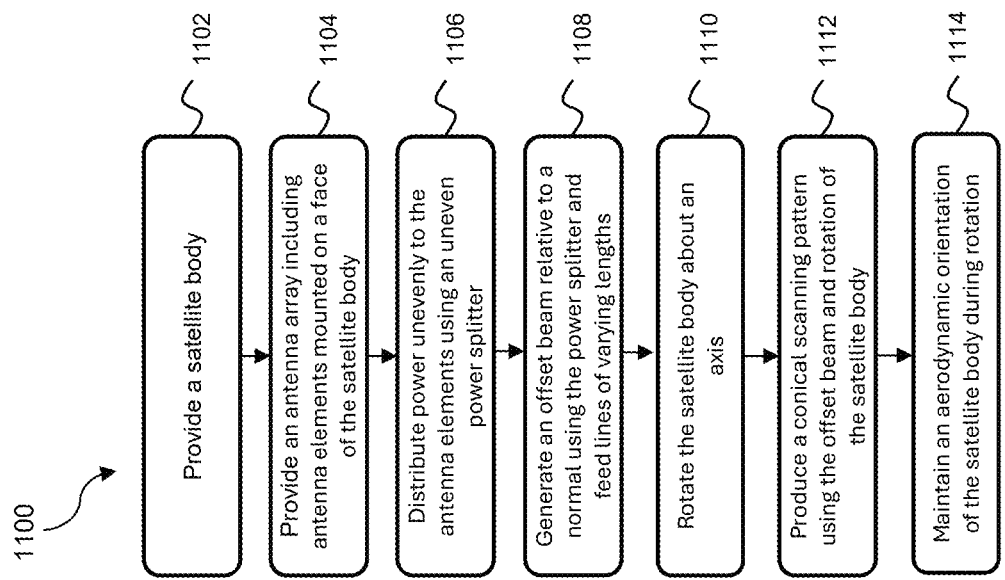
FIG. 11 depicts a flowchart of a method for producing a conical scanning pattern for a satellite, according to aspects of the present disclosure.

FIG. 11 depicts a flowchart of a method 1100 for producing a conical scanning pattern for a satellite, according to aspects of the present disclosure.

At step 1102, a satellite body may be provided. The satellite body may be configured as a flat satellite design with a relatively large surface area compared to its thickness. This configuration may provide advantages in terms of launch efficiency, orbital dynamics, and thermal management. Compared to traditional satellites, relatively higher surface area to volume ratios may be achievable using the flat satellite design described herein. In some aspects, a surface area to volume ratio of the satellite may be at least 10, at least 20, or at least 25.

At step 1104, an antenna array including antenna elements may be mounted on a face of the satellite body. In some aspects, the antenna array may be disposed on the nadir face of the satellite. The antenna array may include a plurality of rows and columns of antennas arranged in a grid-like pattern. The number of rows and columns of antennas in the antenna array may vary depending on the specific requirements and design considerations of the satellite. In some aspects, there may be at least 5 antennas in each row of the antenna array. In some aspects, there may be at least 10 antennas in each row, allowing for enhanced signal coverage and reception capabilities. In some aspects, the antennas in the antenna array may be planar antennas. In some aspects, the planar antennas may be patch antennas. The use of planar antennas, such as patch antennas, may allow for a compact and low-profile design of the antenna array.

At step 1106, power may be distributed unevenly to the antenna elements using an uneven power splitter. The uneven power splitter may provide different power levels to various elements of the antenna array. This uneven power distribution may contribute to achieving the desired beam shape and offset. In some aspects, the uneven power distribution may be implemented using a binomial power weighting across the array elements. The power weighting may be implemented using the uneven splitter to distribute power to the antenna elements.

At step 1108, an offset beam relative to a normal may be generated using the power splitter and feed lines of varying lengths. The feed lines of varying lengths may introduce controlled phase delays between array elements. The combination of uneven power distribution and progressive phase shift may result in an antenna beam that is offset from the normal direction of the antenna face. In some aspects, the offset may be achieved using a progressive phase shift across the array elements. The progressive phase shift may be implemented using tuned feed lengths for the antenna elements. The tuned feed lengths may introduce controlled phase delays between array elements.

At step 1110, the satellite body may be rotated about an axis. The rotation may be performed about the satellite's vertical axis (yaw), longitudinal axis (roll), or lateral axis (pitch), depending on the desired scanning mode. In some aspects, the satellite may switch between these and other scanning modes depending on the observation requirements or mission objectives. The body-spun scanning approach may allow for flexible and efficient data collection without the need for complex mechanical systems or electronically steered arrays.

At step 1112, a conical scanning pattern may be produced using the offset beam and rotation of the satellite body. The combination of the offset beam and satellite rotation may allow the antenna array to scan a conical pattern without requiring complex mechanical steering mechanisms. This configuration may allow the satellite to observe a wide swath of the planet's surface while maintaining an aerodynamic orientation. In some aspects, the offset beam may enable the satellite to perform yaw scanning, roll scanning, or pitch scanning operations. These scanning modes may allow the satellite to observe different segments of its total field of view from various angles, which may improve the quality and time-varying coverage of its measurements.

At step 1114, an aerodynamic orientation of the satellite body may be maintained during rotation. The flat satellite design and the body-spun scanning approach may allow for efficient data collection while minimizing atmospheric drag, which may extend the satellite's operational lifespan. The flat design and the use of planar elements, such as planar antennas and solar panels, may contribute to the satellite's aerodynamic properties by reducing its overall profile and minimizing atmospheric drag. This may be advantageous for satellites operating in low planetary orbit, where atmospheric drag can significantly impact a satellite's lifespan and orbital stability. In some aspects, the combination of these design features may enable the satellite to perform complex scanning operations, such as yaw, roll, and pitch scanning, without compromising its aerodynamic properties.

This method may enable the satellite to perform various scanning modes, such as yaw scanning, roll scanning, or pitch scanning, depending on the observation requirements or mission objectives. The body-spun scanning approach may provide flexible and efficient data collection without the need for complex mechanical systems or electronically steered arrays.

Examples

Exemplary embodiments of the systems and methods disclosed herein are described in the numbered paragraphs below.

A1. A thermal management system for a satellite, comprising:
  a plurality of photovoltaic cells, wherein each photovoltaic cell is configured to generate electrical power;
  an active array antenna comprising a plurality of transmit-receive (T/R) modules, wherein each T/R module is configured to transmit and receive signals, and wherein each T/R module comprises a power amplifier;
  a thermal core thermally coupled to the plurality of photovoltaic cells and the active array antenna, the thermal core configured to spread heat across the satellite; and
  a phase-change material (PCM) element disposed within the thermal core and thermally coupled to the plurality of T/R modules;
  wherein one or more of the plurality of photovoltaic cells are configured to radiate heat generated by the plurality of T/R modules.

A2. The thermal management system of A1, wherein the PCM element is a heat sink and the power amplifiers are thermally attached to the heat sink.

A3. The thermal management system of any of A1 or A2, wherein each T/R module further comprises:
  a directional coupler configured to receive an amplified output from the power amplifier and provide an attenuated transmit signal for calibration; and
  a switch configured to receive an output from the directional coupler and configured to selectively route signals between transmit and receive paths.

A4. The thermal management system of any of A1-A3, wherein the power amplifiers are solid state power amplifiers.

A5. The thermal management system of any of A1-A4, wherein the thermal core comprises a foam fill.

A6. The thermal management system of any of A1-A5, wherein the thermal core provides radio frequency shielding for one or more components of the satellite.

A7. The thermal management system of any of A1-A6, wherein the thermal core further comprises a solid chassis.

A8. The thermal management system of any of A1-A7, further comprising thermally-conductive gap fillers configured to allow heat transfer between the thermal core and one or more thermally coupled components of the satellite.

A9. The thermal management system of any of A1-A8, wherein the thermal core further comprises at least one of embedded heat pipes or vapor chambers, wherein the embedded heat pipes or vapor chambers are configured to improve heat transfer.

A10. The thermal management system of any of A1-A9, wherein the PCM element is configured to absorb or release latent heat to stabilize temperature fluctuations of the satellite.

A11. The thermal management system of any of A1-A10, wherein the plurality of photovoltaic cells includes one or more photovoltaic cells disposed on a zenith face of the satellite.

A12. The thermal management system of any of A1-A11, wherein the plurality of photovoltaic cells includes one or more photovoltaic cells disposed on a nadir face of the satellite.

A13. A method for managing thermal conditions in a satellite, comprising:
  generating electrical power using a plurality of photovoltaic cells;
  transmitting and receiving signals through an active array antenna that includes a plurality of transmit-receive (T/R) modules, each T/R module comprising a power amplifier;
  spreading heat across the satellite using a thermal core, wherein the thermal core is thermally coupled to the plurality of photovoltaic cells and the active array antenna;
  disposing a phase-change material (PCM) element within the thermal core, wherein the PCM element is thermally coupled to the plurality of T/R modules; and
  radiating heat generated by the plurality of T/R modules through one or more of the plurality of photovoltaic cells.

A14. The method of A13, wherein the PCM element is a heat sink and the power amplifiers are thermally attached to the heat sink.

A15. The method of any of A12-A14, wherein each T/R module further comprises a directional coupler configured to receive an amplified output from the power amplifier and provide an attenuated transmit signal for calibration, and a switch configured to receive an output from the directional coupler and configured to selectively route signals between transmit and receive paths.

A16. The method of any of A12-A15, wherein the power amplifiers are solid state power amplifiers.

A17. The method of any of A12-16, wherein the thermal core further comprises a solid chassis.

18. The method of any of A12-A17, further comprising using thermally-conductive gap fillers configured to allow heat transfer between the thermal core and one or more thermally coupled components of the satellite.

A19. The method of any of A12-A18, wherein the thermal core further comprises at least one of embedded heat pipes or vapor chambers, wherein the embedded heat pipes or vapor chambers are configured to improve heat transfer.

A20. A satellite, comprising:
  a plurality of photovoltaic cells disposed on one or more faces of the satellite, wherein each photovoltaic cell is configured to generate electrical power;
  an active array antenna comprising a plurality of transmit-receive (T/R) modules, wherein each T/R module is configured to transmit and receive signals, and wherein each T/R module comprises a power amplifier;
  a thermal core thermally coupled to the plurality of photovoltaic cells and the active array antenna, the thermal core configured to spread heat across the satellite; and
  a phase-change material (PCM) element disposed within the thermal core and thermally coupled to the plurality of T/R modules;
  wherein one or more of the plurality of photovoltaic cells are configured to radiate heat generated by the plurality of T/R modules.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations are not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A thermal management system for a satellite, comprising:
  a plurality of photovoltaic cells, wherein each photovoltaic cell is configured to generate electrical power;
  an active array antenna comprising a plurality of transmit-receive (T/R) modules, wherein each T/R module is configured to transmit and receive signals, and wherein each T/R module comprises a power amplifier;
  a thermal core thermally coupled to the plurality of photovoltaic cells and the active array antenna, the thermal core configured to spread heat across the satellite; and
  a phase-change material (PCM) element disposed within the thermal core and thermally coupled to the plurality of T/R modules;
  wherein one or more of the plurality of photovoltaic cells are configured to radiate heat generated by the plurality of T/R modules.

2. The thermal management system of claim 1, wherein the PCM element is a heat sink and the power amplifiers are thermally attached to the heat sink.

3. The thermal management system of claim 1, wherein each T/R module further comprises:
  a directional coupler configured to receive an amplified output from the power amplifier and provide an attenuated transmit signal for calibration; and
  a switch configured to receive an output from the directional coupler and configured to selectively route signals between transmit and receive paths.

4. The thermal management system of claim 1, wherein the power amplifiers are solid state power amplifiers.

5. The thermal management system of claim 1, wherein the thermal core comprises a foam fill.

6. The thermal management system of claim 5, wherein the thermal core provides radio frequency shielding for one or more components of the satellite.

7. The thermal management system of claim 6, wherein the thermal core comprises a solid chassis.

8. The thermal management system of claim 1, further comprising thermally-conductive gap fillers configured to allow heat transfer between the thermal core and one or more thermally coupled components of the satellite.

9. The thermal management system of claim 1, wherein the thermal core comprises at least one of embedded heat pipes or vapor chambers.

10. The thermal management system of claim 1, wherein the PCM element is configured to absorb or release latent heat to stabilize temperature fluctuations of the satellite.

11. The thermal management system of claim 1, wherein the plurality of photovoltaic cells includes one or more photovoltaic cells disposed on a zenith face of the satellite.

12. The thermal management system of claim 11, wherein the plurality of photovoltaic cells includes one or more photovoltaic cells disposed on a nadir face of the satellite.

13. A method for managing thermal conditions in a satellite, comprising:
  generating electrical power using a plurality of photovoltaic cells;
  transmitting and receiving signals through an active array antenna that includes a plurality of transmit-receive (T/R) modules, each T/R module comprising a power amplifier;
  spreading heat across the satellite using a thermal core, wherein the thermal core is thermally coupled to the plurality of photovoltaic cells and the active array antenna;
  disposing a phase-change material (PCM) element within the thermal core, wherein the PCM element is thermally coupled to the plurality of T/R modules; and
  radiating heat generated by the plurality of T/R modules through one or more of the plurality of photovoltaic cells.

14. The method of claim 13, wherein the PCM element is a heat sink and the power amplifiers are thermally attached to the heat sink.

15. The method of claim 13, wherein each T/R module further comprises a directional coupler configured to receive an amplified output from the power amplifier and provide an attenuated transmit signal for calibration, and a switch configured to receive an output from the directional coupler and configured to selectively route signals between transmit and receive paths.

16. The method of claim 13, wherein the power amplifiers are solid state power amplifiers.

17. The method of claim 13, wherein the thermal core comprises a solid chassis.

18. The method of claim 13, further comprising thermally-conductive gap fillers configured to allow heat transfer between the thermal core and one or more thermally coupled components of the satellite.

19. The method of claim 13, wherein the thermal core further comprises at least one of embedded heat pipes or vapor chambers.

20. A satellite, comprising:
   a plurality of photovoltaic cells disposed on one or more faces of the satellite, wherein each photovoltaic cell is configured to generate electrical power;
   an active array antenna comprising a plurality of transmit-receive (T/R) modules, wherein each T/R module is configured to transmit and receive signals, and wherein each T/R module comprises a power amplifier;
   a thermal core thermally coupled to the plurality of photovoltaic cells and the active array antenna, the thermal core configured to spread heat across the satellite; and
   a phase-change material (PCM) element disposed within the thermal core and thermally coupled to the plurality of T/R modules;
   wherein one or more of the plurality of photovoltaic cells are configured to radiate heat generated by the plurality of T/R modules.

* * * * *